United States Patent
Golubev (10) Patent No.: US 12,510,294 B2
(45) Date of Patent: Dec. 30, 2025

(54) PROCESS FOR CRYOGENIC FRACTIONATION OF AIR, AIR FRACTIONATION PLANT AND INTEGRATED SYSTEM COMPOSED OF AT LEAST TWO AIR FRACTIONATION PLANTS

(71) Applicant: Linde GmbH, Pullach (DE)

(72) Inventor: Dimitri Golubev, Geretsried (DE)

(73) Assignee: Linde GmbH, Pullach (DE)

( * ) Notice: Subject to any disclaimer, the term of this patent is extended or adjusted under 35 U.S.C. 154(b) by 537 days.

(21) Appl. No.: 17/995,456

(22) PCT Filed: Apr. 6, 2021

(86) PCT No.: PCT/EP2021/025125
§ 371 (c)(1),
(2) Date: Oct. 4, 2022

(87) PCT Pub. No.: WO2021/204424
PCT Pub. Date: Oct. 14, 2021

(65) Prior Publication Data
US 2023/0168030 A1 Jun. 1, 2023

(30) Foreign Application Priority Data
Apr. 9, 2020 (EP) .................................. 20020170

(51) Int. Cl.
*F25J 3/04* (2006.01)

(52) U.S. Cl.
CPC ....... *F25J 3/04351* (2013.01); *F25J 3/04018* (2013.01); *F25J 3/0403* (2013.01);
(Continued)

(58) Field of Classification Search
None
See application file for complete search history.

(56) References Cited

U.S. PATENT DOCUMENTS

| 5,251,449 A | 10/1993 | Rottmann |
| 5,257,504 A * | 11/1993 | Agrawal ............... F25J 3/04418 |
| | | 62/646 |

(Continued)

FOREIGN PATENT DOCUMENTS

| CN | 201173660 Y | 12/2008 |
| CN | 107024077 A * | 8/2017 ........... F01K 23/068 |

(Continued)

OTHER PUBLICATIONS

DE102011109781A1 English Machine Translation (Year: 2012).*
EP3327393A1 English Machine Translation (Year: 2018).*

*Primary Examiner* — Jenna M Maroney
(74) *Attorney, Agent, or Firm* — Millen, White, Zelano & Branigan, P.C; Brion P. Heaney (57) ABSTRACT

A process for cryogenic fractionation of air uses an air fractionation plant (100-400) comprises a rectification column system (10) having a high-pressure column (11) operated at a pressure level of 9 to 14.5 bar, a low-pressure column (12) operated at a pressure level of 2 to 5 bar, and an argon column (13). A recirculating stream is formed using a second top gas or a portion thereof, which is heated, compressed, cooled again, and after partial or complete liquefaction or in the unliquefied state is introduced partially or completely, or in fractions, into the first rectification column (11) and/or into the second rectification column (12).

17 Claims, 5 Drawing Sheets

(52) U.S. Cl.
CPC ......... *F25J 3/0409* (2013.01); *F25J 3/04096* (2013.01); *F25J 3/04145* (2013.01); *F25J 3/04315* (2013.01); *F25J 3/04412* (2013.01); *F25J 3/04715* (2013.01); *F25J 3/04727* (2013.01); *F25J 3/04878* (2013.01); *F25J 3/04963* (2013.01); *F25J 2200/06* (2013.01); *F25J 2200/20* (2013.01); *F25J 2200/34* (2013.01); *F25J 2215/52* (2013.01); *F25J 2215/56* (2013.01); *F25J 2235/04* (2013.01); *F25J 2245/42* (2013.01); *F25J 2245/50* (2013.01)

(56) References Cited

U.S. PATENT DOCUMENTS

| | | | |
|---|---|---|---|
| 5,341,647 A | 8/1994 | Agrawal et al. | |
| 5,511,381 A * | 4/1996 | Higginbotham | F25J 3/04296 62/646 |
| 6,666,048 B1 * | 12/2003 | Brugerolle | F25J 3/04715 62/644 |
| 2004/0069016 A1 * | 4/2004 | Guillard | F25J 3/04187 62/643 |
| 2010/0024478 A1 * | 2/2010 | Corduan | F25J 3/04721 62/643 |
| 2018/0347900 A1 * | 12/2018 | Golubev | F25J 3/04351 |
| 2020/0318898 A1 * | 10/2020 | Hirose | F25J 3/04284 |
| 2023/0168030 A1 * | 6/2023 | Golubev | F25J 3/0409 62/646 |

FOREIGN PATENT DOCUMENTS

| | | | | |
|---|---|---|---|---|
| DE | 4327311 | A1 | 2/1995 | |
| DE | 10251485 | A1 | 6/2003 | |
| DE | 102011109781 | A1 * | 3/2012 | ............ F25J 3/0409 |
| DE | 102019008985 | A1 * | 11/2020 | ......... C01B 13/0203 |
| EP | 0580345 | A1 | 1/1994 | |
| EP | 0672878 | A1 * | 9/1995 | |
| EP | 3327393 | A1 | 5/2018 | |
| FR | 2819046 | A1 | 7/2002 | |
| FR | 3013105 | A1 * | 5/2015 | ............ F25J 3/04169 |
| TW | M589780 | U | 1/2020 | |
| WO | WO-0060294 | A1 * | 10/2000 | ............ F25J 1/0012 |
| WO | WO-2023110142 | A1 * | 6/2023 | ............ F25J 3/0406 |

* cited by examiner

PROCESS FOR CRYOGENIC FRACTIONATION OF AIR, AIR FRACTIONATION PLANT AND INTEGRATED SYSTEM COMPOSED OF AT LEAST TWO AIR FRACTIONATION PLANTS

The invention relates to a process for the cryogenic fractionation of air, an air fractionation plant and an integrated system composed of at least two air fractionation plants according to the respective preambles of the independent claims.

BACKGROUND OF THE INVENTION

The production of air products in the liquid or gaseous state by cryogenic fractionation of air in air fractionation plants is known and described, for example, in H.-W. Häring (editor), Industrial Gases Processing, Wiley-VCH, 2006, in particular Section 2.2.5, "Cryogenic Rectification."

Air fractionation plants of the classic type have rectification column systems that can be designed as two-column systems, in particular as double-column systems, but also as triple-column or multi-column systems. In addition to rectification columns for obtaining nitrogen and/or oxygen in the liquid and/or gaseous state, i.e., rectification columns for nitrogen-oxygen separation, rectification columns for obtaining further air components, in particular of noble gases, can be provided.

The rectification columns of the mentioned rectification column systems are operated at different pressure levels. Known double-column systems have a so-called pressure column (also referred to as a high-pressure column, medium-pressure column or lower column) and a so-called low-pressure column (also referred to as an upper column). The high-pressure column is typically operated at a pressure level of 4 to 7 bar, in particular about 5.3 bar, the low-pressure column on the other hand at a pressure level of typically 1 to 2 bar, in particular about 1.4 bar. In certain cases, even higher pressure levels may be used in either rectification column. The pressures cited here and below are absolute pressures at the top of the respective columns indicated.

Air fractionation plants can be designed differently depending on the air products to be delivered and their required aggregate and pressure states. For example, the so-called internal compression is known for providing gaseous pressure products. In this case, a cryogenic liquid is taken from the rectification column system, subjected to a pressure increase in the liquid state, and converted into the gaseous or supercritical state by heating. For example, in this way, internally compressed gaseous oxygen, internally compressed gaseous nitrogen or internally compressed gaseous argon can be produced. The internal compression offers a range of advantages over an alternative, likewise possible external compression and is explained, for example, in Häring (see above), section 2.2.5.2, "Internal Compression."

However, the internal compression is not in all cases advantageous or desired. Alternative plant configurations have therefore been proposed in particular for cases in which argon is to be supplied as well as compressed nitrogen at a pressure level of 9 to 14.5 bar. In general, in such alternative plant configurations, rectification columns for providing gaseous nitrogen can be used which already operate with the desired product pressure. The nitrogen taken from the corresponding rectification column therefore no longer has to be compressed. Rectification columns for argon production can also be used in this context.

The object of the present invention is to specify means which further improve the provision of air products, in particular according to the described requirements profile, and make them more efficient and simpler.

DISCLOSURE OF THE INVENTION

[Regarding Claim 1]

Against this background, the present invention proposes a process for cryogenic fractionation of air and a corresponding air fractionation plant and an integrated system composed of at least two air fractionation plants with the features of the respective independent claims. Each of the embodiments are the subject matter of the dependent claims and of the description below.

In the following, some terms used in describing the present invention and its advantages, as well as the underlying technical background, will first be explained in more detail.

The devices used in an air fractionation plant are described in the cited technical literature, for example in Haring, Section 2.2.5.6, "Apparatus." Unless the following definitions differ, reference is therefore explicitly made to the cited technical literature with respect to terminology used within the framework of the present application.

A "condenser evaporator" refers to a heat exchanger in which a first, condensing fluid stream enters into indirect heat exchange with a second, evaporating fluid stream. Each condenser evaporator has a liquefaction chamber and an evaporation chamber. The liquefaction and evaporation chambers have liquefaction or evaporation passages. Condensation (liquefaction) of the first fluid stream is carried out in the liquefaction chamber, and evaporation of the second fluid stream in the evaporation chamber. The evaporation and liquefaction chambers are formed by groups of passages, which are in a heat-exchanging relationship with one another. Condenser evaporators are also referred to as "top condenser" and "sump evaporator" according to their function, where a top condenser is a condenser evaporator in which top gas is condensed in a rectification column and a sump evaporator is a condenser evaporator in which sump liquid of a rectification column is evaporated. However, the sump liquid can also be evaporated in a top condenser, for example as used in the context of the present invention.

An "expansion turbine" or "expansion machine," which can be coupled via a common shaft to further expansion turbines or energy converters such as oil brakes, generators or compressors, is set up for relieving a gaseous or at least partially liquid stream. In particular, expansion turbines for use in the present invention can be designed as turbo-expanders. When a compressor is driven by one or more expansion turbines, but without any energy supplied externally, for example by means of an electric motor, the term "turbine-driven" compressor or alternatively "booster" is used. Arrangements of turbine-driven compressors and expansion turbines are also referred to as "booster turbines" or, alternatively, as "turbine boosters". If it is mentioned below that expansion takes place in a booster turbine, this is meant to refer to the turbine section. The same applies to the compression, which then takes place in the compressor section of the booster turbine or of the turbine booster.

Multi-stage turbocompressors, referred to herein as "main air compressors," are used in air fractionation plants to compress the feed air that is to be separated. The mechanical construction of turbocompressors is generally known to the person skilled in the art. In a turbocompressor, the compression of the medium to be compressed takes place by means of turbine blades that are arranged on a turbine wheel or impeller or directly on a shaft. A turbocompressor forms a structural unit that, however, may have a plurality of compressor stages in a multi-stage turbocompressor. A compressor stage generally comprises a corresponding arrangement of turbine blades. All of these compressor stages may be driven by a common shaft. However, it may also be provided that the compressor stages are driven in groups with different shafts, wherein the shafts may also be connected to one another via gearing.

The main air compressor is further characterized in that the entire quantity of air supplied to the rectification column system and used for the production of air products, i.e., the entirety of the feed air, is compressed by said main air compressor. Accordingly, a "booster air compressor" may also be provided in which, however, only a portion of the air quantity compressed in the main air compressor is brought to an even higher pressure. This can also be designed as a turbocompressor. The use of a common compressor or of compressor stages of such a compressor as main air compressor and booster can also be provided. For compressing partial air quantities, further turbocompressors in the form of the aforesaid boosters are typically provided in air fractionation plants, which as a rule, in comparison to the main air compressor or the booster, however, effect only a compression to a relatively small extent.

Liquids and gases may, in the terminology used herein, be rich or low in one or more components, wherein "rich" can refer to a content of at least 50%, 75%, 90%, 95%, 99%, 99.5%, 99.9% or 99.99%, and "low" can refer to a content of at most 50%, 25%, 10%, 5%, 1%, 0.1% or 0.01% on a mole, weight or volume basis. The term "predominantly" can correspond to the definition of "rich." Liquids and gases may also be enriched in or depleted of one or more components, wherein these terms refer to a content in a starting liquid or a starting gas from which the liquid or gas has been extracted. The liquid or the gas is "enriched" if it contains at least 1.1 times, 1.5 times, 2 times, 5 times, 10 times, 100 times or 1,000 times the content, and "depleted" if it contains at most 0.9 times, 0.5 times, 0.1 times, 0.01 times or 0.001 times the content of a corresponding component, based on the starting liquid or the starting gas. If, by way of example, reference is made here to "oxygen" or "nitrogen," this is also understood to mean a liquid or a gas that is rich in oxygen or nitrogen but need not necessarily consist exclusively of it.

The present disclosure uses the terms "pressure level" and "temperature level" to characterize pressures and temperatures, which means that corresponding pressures and temperatures in a corresponding plant do not have to be used in the form of exact pressure or temperature values in order to realize the inventive concept. However, such pressures and temperatures typically fall within certain ranges that are, for example, 1%, 5%, 10%, 20% or even 50% around an average. In this case, corresponding pressure levels and temperature levels can be in disjointed ranges or in ranges that overlap one another. In particular, pressure levels, for example, include unavoidable or expected pressure losses. The same applies to temperature levels.

Advantages of the Invention

In the context of the present invention, it has been found that for the requirement profile mentioned at the outset, i.e. the production of gaseous compressed nitrogen at a pressure level of 9 to 14.5 bar and the additional argon production, it is possible to achieve a particularly advantageous process if a double-column system is operated at an elevated pressure level, and if nitrogen is simultaneously removed at the top of the low-pressure column and, in the form of a recirculating stream, is partly or completely heated, compressed, cooled again and fed into the pressure column and/or the low-pressure column after a subsequent liquefaction or in an unliquefied state. In the context of the present invention, the low-pressure column is configured, by using a suitable nitrogen section in the upper region, to provide a nitrogen-rich top gas with the specifications explained below, which is used in the formation of the recirculating stream. In the context of the present invention, one or more additional rectification columns for argon production, for example a crude argon column and a pure argon column of known type are also used.

The present invention proposes a process for the cryogenic fractionation of air using an air fractionation plant with a rectification column system which has a first rectification column, a second rectification column and a third rectification column. The first and second rectification columns are in particular rectification columns which can be formed in accordance with a pressure column and a low-pressure column of a known double-column system and are generally connected in a comparable manner. However, these are operated at an increased pressure level. The third rectification column is in particular a crude argon column or a single column for obtaining an argon product which partially combines the functions of a raw and pure argon column with one another by having a further section provided for separating off nitrogen.

The first rectification column provided in the context of the present invention is operated at a first pressure level, a first feed stream is fed into the first rectification column, which is formed using cooled compressed air, and a first sump liquid enriched with oxygen and argon in relation to the first feed stream and a nitrogen-rich first top gas are formed in the first rectification column.

The first sump liquid can in particular have a content of 28 to 38% oxygen and argon and nitrogen. The first top gas can in particular have a content of 0.1 to 100 ppb, for example approximately 10 ppb, oxygen, 1 to 100 ppm, for example approximately 30 ppm, argon, and otherwise essentially nitrogen and possibly lighter components.

In the context of the present invention, the second rectification column is operated at a second pressure level, and (at least) one second feed stream is fed into the second rectification column, which is formed using the first sump liquid or a part thereof. As will also be explained below, the first sump liquid, or a corresponding part, can be used in particular also for cooling the top condensers of the argon production column(s), thereby giving rise to possibly evaporated and unevaporated fractions which are fed into the second rectification column as feed stream or feed streams. In the second rectification column, an oxygen-rich second sump liquid and a nitrogen-rich second top gas are formed.

The second top gas can in particular be at a content of 1 to 1000 ppb, for example about 100 ppb, oxygen and 3 to 300 ppm, for example about 90 ppm, argon. In certain cases, for example the embodiment according to FIG. 2, the first and second top gas can also have essentially the same contents.

A third feed stream is fed into the third rectification column, which is formed using fluid which has a higher argon content than the second sump liquid and the second top gas and is removed from the second rectification column, typically at the so-called argon belly or below it, and in the third rectification column a third top gas enriched with argon with respect to the third feed stream is formed. The third feed stream does not have to be formed directly from the fluid which has a higher argon content than the second sump liquid and the second top gas and is removed from the second rectification column, but can also be formed using fluid which is removed from a further rectification column or another separation apparatus which in turn is fed with the fluid removed from the second rectification column. The same is described below with reference to a fourth rectification column for obtaining high-purity oxygen.

In the context of the present invention, the first rectification column can in particular be formed with 80 to 110, for example 90, theoretical plates, the second rectification column with 90 to 150, for example 110, theoretical plates and the third rectification column with 210 to 280, for example 250, theoretical plates.

In the context of the present invention, the first pressure level is from 9 to 14.5 bar, for example about 11.6 bar, at the top of the first rectification column and the second pressure level is 2 to 5 bar, for example about 3.5 bar, at the top of the second rectification column.

According to the invention, the second top gas or a part thereof is used in order to form a recirculating stream, which is heated, compressed, cooled again and, after partial or complete liquefaction or in an unliquefied state, is fed partly or completely or in fractions into the first rectification column and/or into the second rectification column. In this way, the efficiency of the proposed air fractionation process is significantly improved. In other words, in one embodiment of the invention, at least a portion of the second top gas can thus be heated in succession as a recirculating gas, compressed, cooled again and then fed into the first rectification column.

If a partial or complete liquefaction takes place, it can be carried out in the context of the present invention, in particular using a condenser evaporator arranged in a sump area of a further rectification column explained below and/or a main condenser connecting the first and second rectification columns in a heat-exchanging manner.

In the context of the present invention, in particular, significantly more than 85%, for example about 90%, of the argon from the second rectification column can be transferred into the argon production system and thus the third rectification column, and used to obtain an argon product. When argon is obtained, an argon yield of also more than 85%, for example about 90%, can be achieved. A yield of more than 90% is also possible.

In the context of the present invention, a compression of the nitrogen product can be dispensed with in particular, i.e. in certain embodiments, by the operation of the pressure column at the first pressure level. For the compressor, which compresses the second top gas or a corresponding part thereof to form the recirculating stream, a comparatively simple configuration, for example with only two compression stages, can be used. This compressor can also be designed in particular in the form of a so-called combination compressor, which, for example, also comprises four stages which fulfill the function of the main air compressor. In other words, the compression of the compressed air and of the second top gas used to form the recirculating stream or of a corresponding part thereof can be carried out using a jointly driven compressor arrangement.

In contrast to the processes for the production of product nitrogen that is not further compressed mentioned at the beginning, the use of a further rectification column and the corresponding apparatuses can be dispensed with in the context of the present invention, so that the process proposed in accordance with the invention requires a significantly lower capital expenditure. In contrast to known processes, a higher argon production is obtained with a comparable energy requirement.

As mentioned, in the context of the present invention, at least a portion of the first top gas can be discharged from the air fractionation plant at the first pressure level, i.e. without further compression, as a compressed nitrogen product.

In principle, however, it is also possible, for the purpose of forming the second recirculating stream, to heat, compress and cool down again only a first part of the second top gas and to feed it in part or completely or in portions into the first and/or second rectification column after partial or complete liquefaction or unliquefied, but, on the other hand, to only heat and compress a second portion of the second top gas and to use it to provide a compressed nitrogen product that is discharged from the air fractionation plant. The heating and compression of the second part can take place in particular together with the first part. In contrast to the use of the first top gas as the product, this alternative has the particular advantage that the heat exchanger used to cool the compressed stream is significantly smaller and the system has a lower energy requirement. The compression of the high-purity nitrogen product can be seen as a disadvantage, since the purity of the second top gas in this case is very similar to that of the first top gas. The compression of the high-purity nitrogen product is not desired or not accepted in many cases due to possible impurities.

In one embodiment of the present invention, the recirculating stream can be fed partly or completely in an unliquefied state into the first rectification column in an intermediate region. In this case, an "intermediate region" represents a region above and below which separation plates are located. In particular, a separation section is located above the intermediate region, which separation section can subject the fed recirculating stream or a correspondingly fed part thereof to a further purification and in this way can contribute to the formation of a cleaner first top gas, and thus a cleaner compressed nitrogen product.

In another embodiment of the present invention, it is provided that the recirculating stream or a part thereof is condensed and fed into the first rectification column using a condenser evaporator which connects the first rectification column and the second rectification column in a heat-exchanging manner.

In a further embodiment of the invention, the recirculating stream or a part thereof is partly or completely condensed and fed into the second rectification column. In this case, the feed point is shifted in comparison to the variant described last. The liquefaction can in particular be carried out using the mentioned condenser evaporator arranged in the sump area of the further rectification column explained below.

In a particularly preferred embodiment of the present invention, a further air fractionation plant is used, by means of which nitrogen-rich gas with an oxygen content of 0.1 to 100 ppm is provided at a pressure level of ambient pressure up to 1.5 bar, and this gas is combined at least in part with the recirculating stream with as similar an oxygen content as possible. In this way, particular advantages are obtained in particular compared to a separate purification device for corresponding gas, since the present invention makes it possible to further purify this gas in the first rectification column. The process is optimized in such a way that the purity of the second top gas is similar to the purity of nitrogen-rich gas from the other air fractionation plant. The feed further increases the yield in the overall view and reduces energy consumption. By significantly reducing the amount of fractionation air to be compressed, the system costs are also reduced.

In particular, in the embodiment of the present invention just explained, the nitrogen-rich gas provided by means of the further air fractionation plant can initially be compressed at least partly to the second pressure level and then combined with the recirculating stream.

In a particularly preferred embodiment of the present invention, the fluid which has a higher argon content than the second sump liquid and the second top gas and which is removed from the second rectification column, can be fed, as already mentioned, into a further, i.e. fourth, rectification column, and the third feed stream can be formed using fluid which is removed from this further rectification column. The further rectification column is configured in particular to form a high-purity oxygen product and is operated as explained below.

The further rectification column has in particular a first (upper) part and a second (lower) part, wherein a "barrier plates" rectification section, which serves in particular for retention of hydrocarbons, is arranged between the first and the second part. In particular, the first part of the further rectification column can be formed functionally as a lowermost part of a crude argon column and can accordingly be coupled to the actual crude argon column, i.e. the third column. A corresponding embodiment is carried out in particular for reasons of construction space in order to reduce the overall height of the air fractionation plant. The fluid, which is taken from the second rectification column and which is used to form the third feed stream, is fed into a lower region of the first part. Gas is removed from an upper region of the first part and used in the formation of the third feed stream. Sump liquid formed in the third column is transferred at least partially into the upper region of the first part.

Liquid is removed from an intermediate region of the first part and fed into an upper region of the second part in which the actual pure oxygen production takes place. Gas is removed from the upper region of the second part and fed into the intermediate region of the first part, and pure oxygen is formed in a lower region of the second part and discharged from the air fractionation plant. The pure oxygen can in particular be formed with a residual content of 5 to 500 ppb, for example approximately 10 ppb.

If no corresponding further or further split column is present, the fluid from the second column can also be fed directly into the third column, i.e. a crude argon column.

In the context of the present invention, the lower region of the second part of the further rectification column is heated in particular using a condenser evaporator in which the part of the first top gas and/or the recirculating stream is used as heating fluid. The part of the first top gas and/or of the recirculating stream used as heating fluid can then be fed into the first rectification column or into the second rectification column in particular in liquefied state.

According to a particularly preferred embodiment of the present invention, gas, in particular so-called impure nitrogen, below a nitrogen section, can be removed from the second rectification column, heated, turbine expanded and discharged from the air fractionation plant. The particular advantage of the present invention is that only one corresponding cryogenic expansion machine has to be used and at the same time a relatively high liquid production can be carried out.

The first sump liquid or at least its part which is used to form the second feed stream can, as mentioned several times, be fed to the condensation of top gas at least of the third rectification column. The third top gas can, in particular, as known per se from the prior art, be purified in a pure argon column to give pure argon.

Regarding the features of the air fractionation plant likewise proposed according to the invention, reference is made expressly to the corresponding independent claim. This air fractionation plant is in particular configured to carry out a process as previously explained in embodiments. Reference is therefore expressly made to the above explanations regarding the process according to the invention and its advantageous embodiments.

The invention will be described in more detail below with reference to the accompanying drawings, which illustrate preferred embodiments of the present invention.

In the figures, elements corresponding functionally or structurally to one another are indicated by identical reference signs and for the sake of clarity are not explained repeatedly. Explanations relating to plants and plant components apply in the same way for corresponding processes and process steps.

Figure 1:
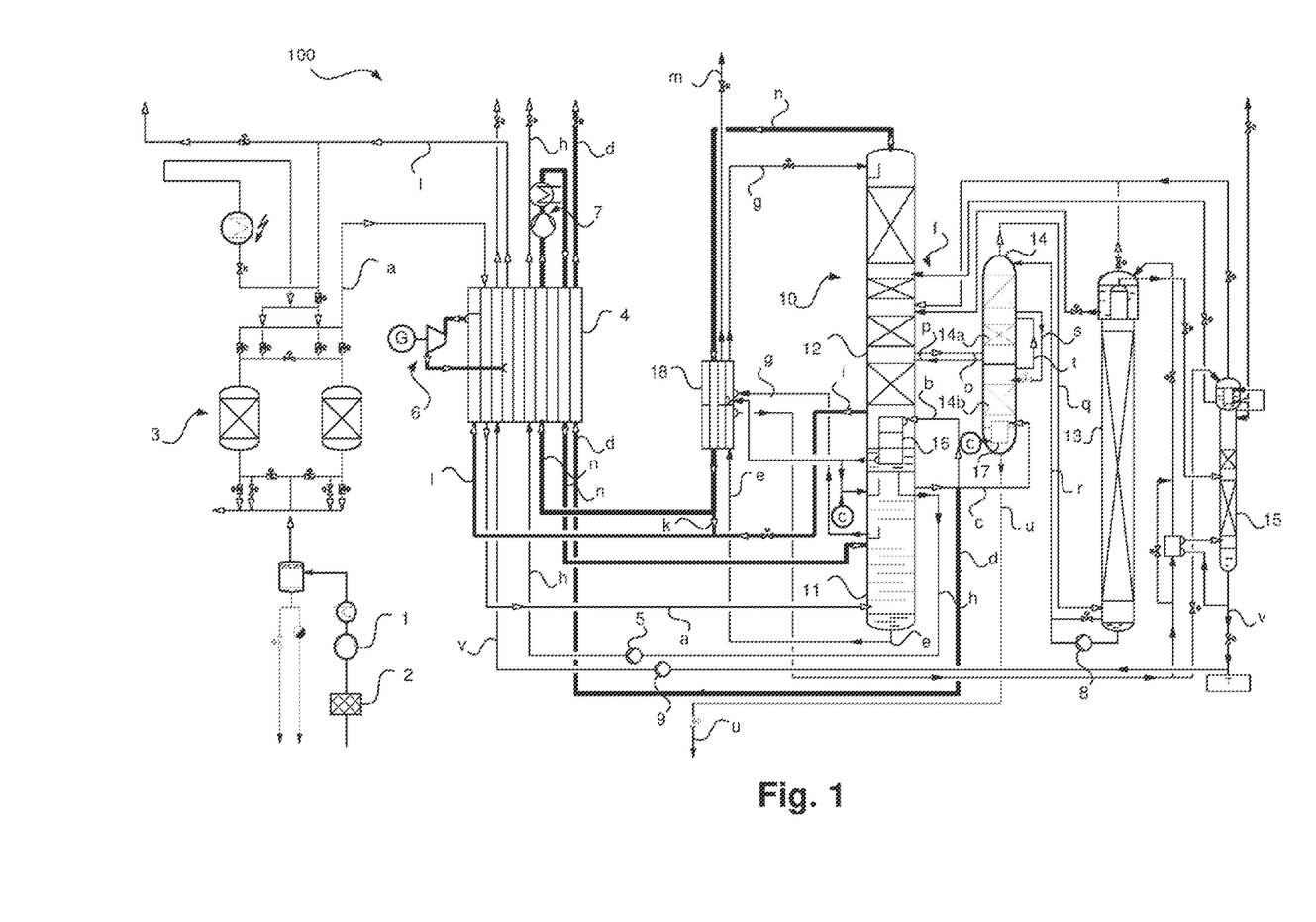
FIGS. 1 to 5 illustrate air fractionation plants according to different embodiments of the present invention.

In FIG. 1, an air fractionation plant according to an embodiment of the present invention is illustrated in the form of a simplified process flow diagram and is denoted as a whole by 100.

In the air fractionation plant 100, air is sucked by means of a main air compressor 1 via a Filter 2 and compressed to a pressure level of, for example, about 12.5 bar. After cooling and separation of water, the correspondingly compressed air is freed of residual water and carbon dioxide in an adsorber station 3, which can be designed in a manner known per se. For the design of the mentioned components, reference is made to the technical literature cited at the outset.

A correspondingly formed compressed air stream a is conducted from the warm to the cold end through a main heat exchanger 4 and fed as feed stream (referred to above and hereinafter also as "first feed stream") into a pressure column 11 ("first rectification column") of a rectification column system 10. In the example shown, the rectification column system 10 has, in addition to the pressure column 11, a low-pressure column 12 ("second rectification column"), a crude argon column 13 ("third rectification column") and a pure oxygen column 14 ("fourth rectification column") with an upper part 14a ("first part") and a lower part 14b ("second part") and a pure argon column 15 ("fifth rectification column"). The pressure column 11 is connected in a heat-exchanging manner to the low-pressure column 12 via a main condenser 16, which can in particular be designed as a multi-level bath evaporator, and a sump evaporator 17 is arranged in the bottom of the lower part 14b of the pure oxygen column 14. In the example shown, a subcooling heat exchanger 18 is also associated with the rectification column system 10.

At the top of the pressure column 11, a top gas ("first top gas") is formed. In the example shown, part of this is fed in the form of a material stream b through the main condenser 16 and led to a further part in the form of a material stream c through the sump evaporator 17. Some of the condensate formed in this way is returned to the pressure column 11 as reflux. Further condensate can be fed in the form of a liquid nitrogen stream m through the subcooling heat exchanger 18 and, for example, can be provided as a corresponding product. In a deviation from the illustrated embodiment, the material stream c can also be fed separately to the material stream b into the pressure column 11 or can be subcooled separately in the subcooling heat exchanger 18 and fed into the low-pressure column 12. A further part of the top gas of the pressure column 11 is used to form a material stream d which is heated in the main heat exchanger 4 and is discharged from the air fractionation plant 100 as product at a content of, for example, about 10 ppb of oxygen and at a pressure of, for example, about 11.8 bar.

In the sump of the pressure column 11, a sump liquid ("first sump liquid") is formed and is removed therefrom in the form of a material stream e. The material stream e is initially fed through the subcooling heat exchanger 18 and then used in a manner known per se to cool the top condensers of the crude argon column 13 and the pure argon column 15, which are not designated separately. Evaporated and unevaporated fractions are fed into the low-pressure column 12 in the form of material streams f (comprising a "second feed stream"). From an intermediate region of the pressure column 11, fluid with a lower nitrogen content than the top gas is removed from the pressure column 11, conducted through the subcooling heat exchanger 18 and then fed into the low-pressure column 12.

In the low-pressure column 12, sump liquid ("second sump liquid") is formed, which is removed therefrom in the form of a material stream h, is pressurized in a pump 5, heated in the main heat exchanger 4 and discharged as an internally compressed oxygen product. Above the sump, gas is removed from the low-pressure column 12 in the form of a material stream i, combined with a material stream k explained below to form a collection stream I with a content of, for example, about 90% oxygen, partially heated in the main heat exchanger 4, expanded in a generator turbine 6, heated again in the main heat exchanger 4, and used, for example, as regeneration gas in the adsorber station 3.

A gaseous compressed nitrogen stream ("second top gas") is removed from the top of the low-pressure column 12 in the form of a material stream n. This is present, for example, at a pressure level of approximately 3.7 bar and has a content of, for example, about 100 ppb of oxygen. It is used, minus the above-mentioned material stream k, to form a recirculating stream, which is initially fed through the subcooling heat exchanger 18, then heated in the main heat exchanger 4, compressed in a compressor 7, cooled again in the main heat exchanger 4, and is fed into the pressure column 11 in the intermediate region already mentioned.

From the low-pressure column 11, gas enriched in argon is removed in the form of a material stream o and fed into the upper part 14a of the pure oxygen column 14. As already mentioned, this upper part 14a in the example shown is functionally a part of the crude argon column 13. Therefore, reference is made to the explanations above. In another embodiment with a correspondingly modified crude argon column, the material stream o can also be fed directly into the crude argon column. From the lower region of upper part 14a, sump liquid in the form of a material stream p is recycled into the low-pressure column 11. Top gas q from the upper part 14a of the pure oxygen column 14 is used to feed the crude argon column 13, sump liquid r of the crude argon column is pumped back by means of a pump 8 onto the upper part 14a of the pure oxygen column 14. The upper part 14a and the lower part 14b of the pure oxygen column 14 are connected to one another via material stream s and t. The material stream s is removed in liquid form from an intermediate region of the upper part 14a and fed onto the lower part 14b. The material stream t is removed in gaseous form at the top of the lower part 14b and fed into the intermediate region of the upper part 14a. From the sump of the lower part 14b of the pure oxygen column, a high-purity oxygen stream u having a residual content of, for example, about 10 ppb of argon is removed. In this case, for example, a use of a pressure buildup evaporation and a corresponding provision of an internal compression product are also possible.

The operation of the crude argon column 13 and the pure argon column 15 essentially corresponds to the prior art and is not explained separately. From the pure argon column 15, a pure argon stream v is removed, which is partly stored or temporarily stored in a Tank T and partially compressed using a pump 9 and can be provided as an internal compression product with a content of, for example, about 1 ppm of oxygen.

Figure 2:
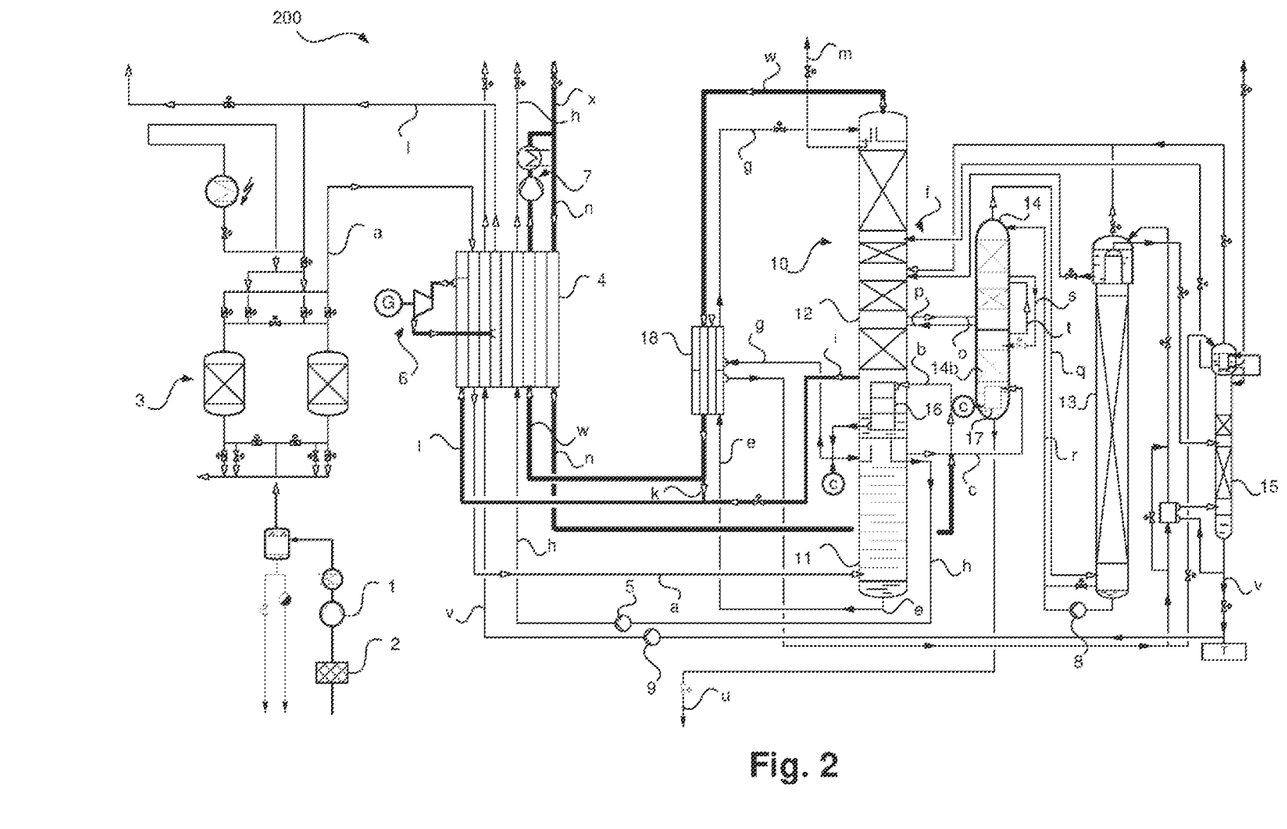

In FIG. 2, an air fractionation plant according to a further embodiment of the present invention is illustrated in the form of a simplified process flow diagram and is denoted as a whole by 200.

In contrast to the air fractionation plant 100 according to FIG. 1, the material stream d is not formed here and a nitrogen product is provided instead using the top gas of the low-pressure column 12. In this case, a material stream denoted by w is removed from the low-pressure column 12. After channeling off the material stream k as above, heating in the main heat exchanger 4 and compression in the compressor 7, a portion in the form of a material stream x is provided as a product, whereas another portion in the form of a material stream also designated here as n is cooled again and combined with the top gas removed from the pressure column 11 and treated in the same way as the latter. Reference is made to the explanations of FIG. 1 with respect to the "first top gas".

In other words, it is provided here that parts of the material stream n, such as the top gas removed from the first rectification column, are fed into the pressure column 11 and into the low-pressure column 12. In the embodiment of the invention illustrated here, the material stream n is fed to the top gas of the pressure column 11 before its condensation, so that here the material streams b and c are formed using the material stream n. Instead of being formed from the intermediate region, as is the case in the air fractionation plant 100 shown in FIG. 1, a material stream g, also denoted g here for simplicity, is formed from corresponding condensate.

Figure 3:
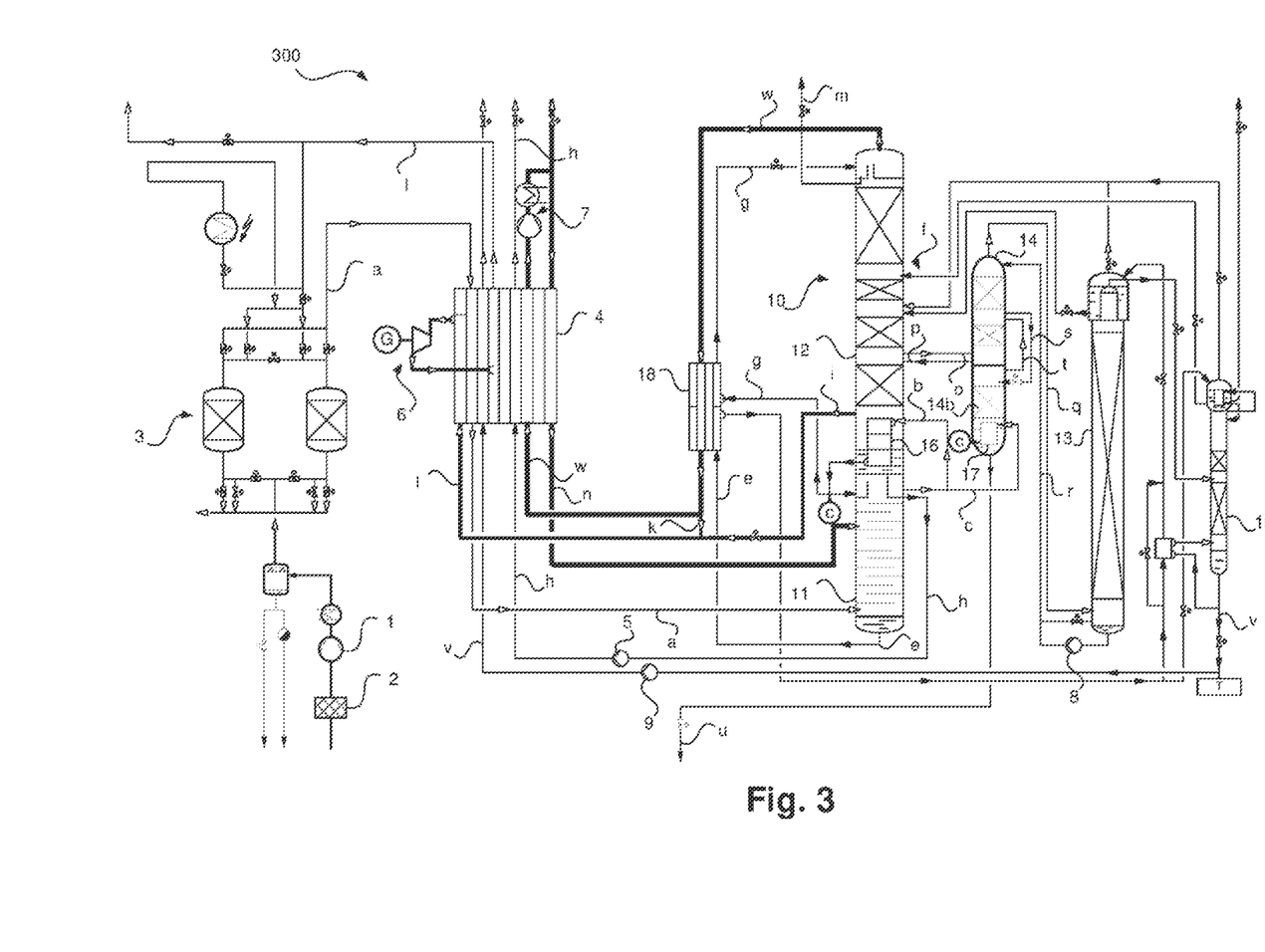

In FIG. 3, an air fractionation plant according to a further embodiment of the present invention is illustrated in the form of a simplified process flow diagram and is denoted as a whole by 300.

The air fractionation plant 300 according to FIG. 3 represents a variant of the air fractionation plant 200 according to FIG. 2, in which the material stream n, comparable to the air fractionation plant 100 according to FIG. 1, is fed into an intermediate region into the pressure column 11. However, the formation of material stream g takes place in this embodiment as in the air fractionation plant 200 according to FIG. 2.

Figure 4:
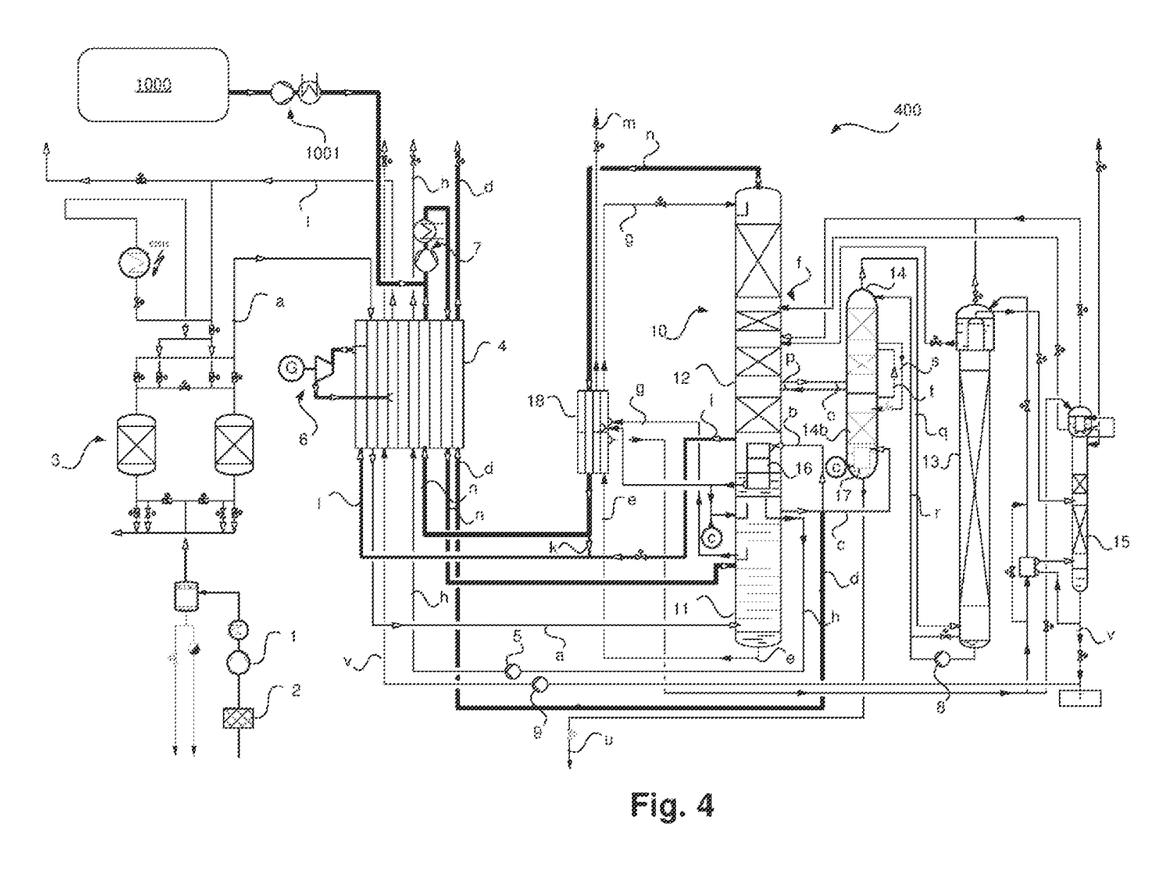

In FIG. 4, an air fractionation plant according to a further embodiment of the present invention is illustrated in the form of a simplified process flow diagram and is denoted as a whole by 400.

In the example illustrated here, the air fractionation plant 400 according to FIG. 4 represents a variant of the air fractionation plant 100 according to FIG. 1; the measures explained below and illustrated in FIG. 4 can however also be used in all other embodiments of the invention.

The air fractionation plant 400 according to FIG. 4 is associated with a further air fractionation plant 1000, by means of which a material stream z is supplied, which is present, for example, at a pressure level of about 1.1 bar and has a content of about 1 ppm of oxygen and otherwise nitrogen. The material stream z can in particular be removed from a low-pressure column (not illustrated) of the further air fractionation plant 1000. It can be brought to the pressure level of the material stream n in a corresponding compressor 1001. The feed of the material stream z to the material stream n makes it possible to dispense with purification of the material stream z, for example to a content of about 1 ppb of oxygen, because the material stream z is used to provide the material stream d with a correspondingly low oxygen content.

Figure 5:
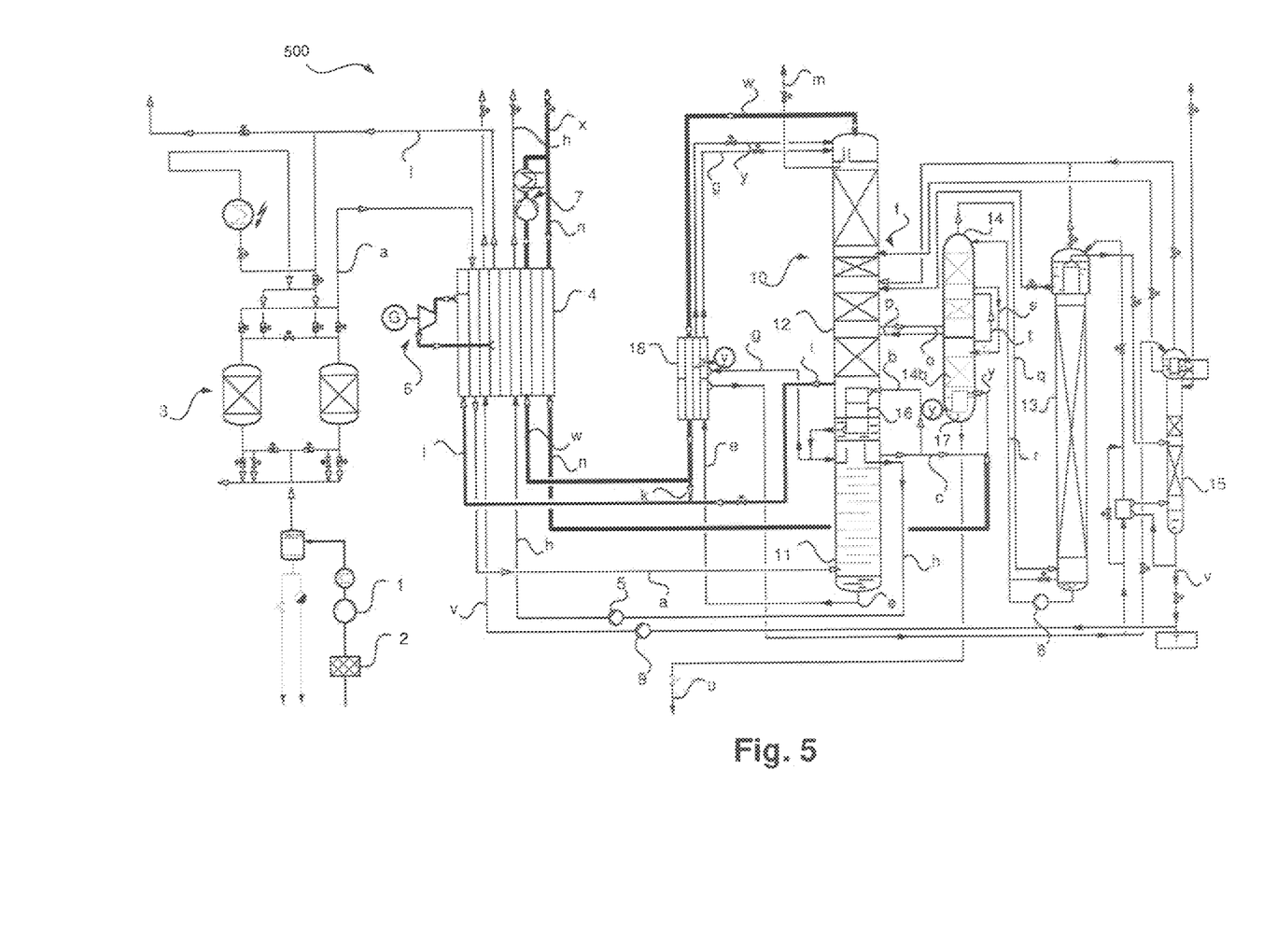

In FIG. 5, an air fractionation plant according to a further embodiment of the present invention is illustrated in the form of a simplified process flow diagram and is denoted as a whole by 500.

The air fractionation plant 500 illustrated in FIG. 5 represents a modification of the previously illustrated air fractionation plants in that here the material stream n, after cooling in the main heat exchanger 4, is combined with the material stream c to form a material stream designated here as y, which is first fed through the condenser evaporator 17 and then through the subcooling heat exchanger 18 and fed in a liquefied state at the head of the second rectification column 12.

The invention claimed is:

1. A process for cryogenic fractionation of air using an air fractionation plant with a rectification column system having a first rectification column, a second rectification column, and a third rectification column, the process comprising:
   operating the first rectification column at a first pressure level, feeding a first feed stream into the first rectification column, wherein first feed stream is formed using cooled compressed air, and forming a first sump liquid enriched in oxygen and argon in comparison to the first feed stream and a nitrogen-rich first top gas in the first rectification column,
   operating the second rectification column at a second pressure level, feeding a second feed stream formed using at least a portion of the first sump liquid into the second rectification column, and forming an oxygen-rich second sump liquid and a nitrogen-rich second top gas in the second rectification column, and
   feeding a third feed stream into the third rectification column, wherein the third feed stream is formed using fluid which has a higher argon content than the second sump liquid and the second top gas and which is removed from the second rectification column, and forming a third top gas enriched in argon in comparison to the third feed stream in the third rectification column,
wherein
   the first pressure level ranges from 9 to 14.5 bar at the top of the first rectification column and the second pressure level ranges from 2 to 5 bar at the top of the second rectification column, and
   the second top gas or a part thereof is used to form a recirculating stream, the recirculating stream is heated, compressed, cooled again, and, after partial or complete liquefaction, is completely fed into the second rectification column, wherein the partial or complete liquefaction of the recirculating stream is carried out, after cooling, by condensing the recirculating stream partially or completely using a condenser evaporator located in a sump area of a further rectification column.

2. The process according to claim 1, wherein a first portion of the second top gas is used to form the recirculating stream, and in which a second portion of the second top gas is only heated, compressed and used to provide a compressed nitrogen product that is discharged from the air fractionation plant.

3. The process according to claim 1, wherein a further air fractionation plant is used, wherein nitrogen-rich gas having an oxygen content of 0.1 to 100 ppm is provided by means of the further air fractionation plant at a pressure level of ambient pressure up to 1.5 bar and is partially or completely combined with the recirculating stream.

4. The process according to claim 3, wherein the nitrogen-rich gas provided by means of the further air fractionation plant is initially compressed partly or completely separated from the recirculating stream to the second pressure level and then combined with the recirculating stream.

5. The process according to claim 1, wherein the fluid having a higher argon content than the second sump liquid and the second top gas and which is removed from the second rectification column is fed into the further rectification column, and the third feed stream is formed using a top gas removed from the further rectification column.

6. The process according to claim 5, wherein the further rectification column has a first part and a second part (14b), wherein
   the fluid which is removed from the second rectification column and which is used to form the third feed stream, is fed into a lower region of the first part,
   gas from an upper region of the first part is removed and used in the formation of the third feed stream,
   sump liquid is formed in the third rectification column and is at least partially transferred into the upper region of the first part,
   liquid from an intermediate region of the first part is removed and fed into an upper region of the second part,
   gas from the upper region of the second part is removed and fed into the intermediate region of the first part, and
   pure oxygen is formed in a lower region of the second part and discharged from the air fractionation plant.

7. The process according to claim 6, wherein the sump area of the further rectification column is in the second part of the further rectification column.

8. The process according to claim 1, wherein a gas stream is removed from the second rectification column, heated, turbine expanded and discharged from the air fractionation plant.

9. The process according to claim 1, wherein the at least a portion of the first sump liquid is used to form the second feed stream is fed to a top condenser of the third rectification column before being fed into the second rectification column as the second feed stream.

10. The process according to claim 1, wherein the third top gas is purified in a pure argon column to give pure argon.

11. An air fractionation plant comprising:
   a rectification column system which has a first rectification column, a second rectification column, and a third rectification column, and which
   wherein the first rectification column is configured to operate at a first pressure level, the first rectification column having a feed line for feeding a first feed stream, formed using cooled compressed air, into the first rectification column, a first sump liquid removal line for removing a first sump liquid, enriched in oxygen and argon in comparison to the first feed stream, from the first rectification column, and a first top gas removal line for removing a nitrogen-rich first top gas from the first rectification column, wherein the second rectification column is configured to operate at a second pressure level, the first rectification column having a second feed line for feeding a second feed stream, formed using at least a portion of the first sump liquid, into the second rectification column, a second sump liquid removal line for removing an oxygen-rich second sump liquid from the second rectification column, and a second top gas removal line for removing a nitrogen-rich second top gas from the second rectification column, and wherein the third rectification column has a third feed stream line for feeding a third feed stream, which is formed using fluid having a higher argon content than the second sump liquid and the second top gas, into the third rectification column, the third feed stream being removed from the second rectification column, and a third feed stream top gas line for removing a third top gas, enriched with argon in comparison to the third feed stream, from the third rectification column, wherein the air fractionation plant is configured to be operated such that the first pressure level ranges from 9 to 14.5 bar at the top of the first rectification column and the second pressure level ranges from 2 to 5 bar at the top of the second rectification column, and the air fractionation plant further comprises means for forming a recirculating stream from the second top gas or a part thereof, means for heating, compressing, and cooling the recirculating stream, means for partial or complete liquefaction of the recirculating stream, and means for completely feeding the partially or completely liquefied recirculating stream into the second rectification column, wherein the means for partial or complete liquefaction of the recirculating stream comprises a condenser evaporator located in a sump area of a further rectification column.

12. The process according to claim 1, wherein the further rectification column has a first part and a second part in which the sump area is located in the second part.

13. The process according to claim 12, wherein
the fluid having a higher argon content than the second sump liquid and the second top gas and which is removed from the second rectification column is fed into the first part of the further rectification column, and
the third feed stream, which is formed from the fluid having a higher argon content than the second sump liquid and the second top gas, is removed as a top gas from the first part of the further rectification column.

14. The process according to claim 12, wherein a third sump liquid is formed in the third rectification column and the third sump liquid is at least partially transferred into the first part of the further rectification column.

15. The process according to claim 1, wherein, before the recirculating stream is partially or completely condensed using the condenser evaporator located in the sump area of the further rectification column, the second top gas or the part thereof is combined with a part of the first top gas from the first rectification column to form the recirculating stream.

16. The process according to claim 12, wherein argon-enriched gas is removed from the second rectification column and fed into the upper part of the further rectification column.

17. The process according to claim 12, wherein a further sump liquid is removed from a lower region of upper part of the further rectification column and the further sump liquid is fed into the second rectification column.

* * * * *